United States Patent [19]

Ebeling

[11] Patent Number: 4,687,945

[45] Date of Patent: Aug. 18, 1987

[54] LOW POWER GENERATOR

[75] Inventor: Donald C. Ebeling, Plainview, Tex.

[73] Assignees: Loyd Lowery; Joyce Lowery, both of Lubbock, Tex.

[21] Appl. No.: 711,595

[22] Filed: Mar. 13, 1985

[51] Int. Cl.⁴ .............................................. A02K 21/22
[52] U.S. Cl. ................................ 290/37 R; 310/70 R; 290/40 R
[58] Field of Search .................... 310/70 R; 290/37 R, 290/40

[56] References Cited

U.S. PATENT DOCUMENTS

| | | | |
|---|---|---|---|
| 1,303,469 | 5/1919 | Galantin | 310/70 R |
| 2,385,226 | 9/1945 | Ochsenbein | 310/70 R |
| 4,306,167 | 12/1981 | Tomite et al. | 310/70 R |

FOREIGN PATENT DOCUMENTS 2073502 10/1981 United Kingdom ............. 310/68 R

Primary Examiner—Bernard Roskoski
Attorney, Agent, or Firm—Wendell Coffee

[57] ABSTRACT

A stationary spark ignition internal combustion engine which normally operates unattended continuously for long periods of time is modified to eliminate problems in electrical systems. The battery and voltage regulator of the engine is removed and the electrical generator replaced by a magnetic generator which produces low power levels which are sufficient only to operate the spark ignition system. A plastic bushing and "O" rings are used to mount a disc magnet to the magnetic generator shaft.

3 Claims, 6 Drawing Figures

LOW POWER GENERATOR

CROSS REFERENCE TO RELATED APPLICATIONS

BACKGROUND OF THE INVENTION

1. Field of the Invention

This invention relates to spark ignition internal combustion engines which run unattended, continuously for long periods of time.

Typical operation of such engines are irrigation engines used for agricultural purposes, and a person having ordinary skill to which this invention relates is a farmer or a mechanic specializing in repair of agricultural equipment.

2. Description of the Prior Art

In agricultrual operations today, much of the land is irrigated from wells. Normally, to pump the wells requires a power output readily supplied by automotive spark ignition engines. Ordinary automobile engine having about 300 cubic inch displacement have found commercial use and ready acceptance for this service. These engines are equipped with low voltage D.C. electrical systems, i.e. 12 volts D.C. In commercial use, the engines are operated at speeds between 1,400 rpm. and 2,400 rpm. Normally they are cooled by the water pumped, thereby eliminating the power required by a fan drawing cooling air through a radiator. The engines are also normally operated for over 24 hours continuously and normally operated about seven days continuously.

Because the engines operate for over 24 hours unattended they have "kill" switches attached thereto. These kill switches are connected to the electrical system so that if the temperature exceeds a preset amount, the engine is killed. These switches are also set so that if the oil pressure falls below a preset minimum, the engine is killed. Sometimes these automatic switches will have a simple water flow meter so that if there is a cessation or irregular flow of the irrigation water pumped that the engine will be killed.

As stated before, such engines are in wide spread commercial use, and on the whole, satisfactory. However, problems arise from two main sources. Since these engines are located in remote locations and unattended, difficulty is experienced by thieves stealing the batteries from the engines.

In addition, the electrical system requires frequent service. By electric system is meant to include the voltage regulator, the battery, and the generator as well as the distributor and starter. Normally, commercially available voltage regulators and batteries are not particularly adapted for continuous operation without the current being taken from the battery as in normally automotive use. Of course in normal automotive use, there are lights and horn attached to the battery and the battery is frequently used to provide starting current.

Therefore, in the peculiar stationary continuous operating usage, the batteries and voltage generators fail far more often than in normal operative use, for which these elements were designed.

Also, often in agricultural use, the equipment is exposed to more dust and dirt than in normal operative use. Therefore, the brushes of the generator often are subject to excessive wear and fail more frequently than in normal operative use.

In normal use in these agricultural instances, the battery upon the stationary engine is not used for starting purposes. Since the engines are infrequently started, the farmer normally experiences easier starting operation to use a booster battery. i.e., normally, the farmer will arrive at the stationary engine in a pickup truck and will attach jumper cables from his truck battery to the irrigation engine and start it from the battery upon his pickup truck. That is usually more satisfactory than depending upon the battery or stationary engine. Often, the farmer will use a 24 volts (obtained from two 12 volt batteries) to start an engine normally operating on a 12 volt electrically system inasmuch as it starts quicker and easier in such a fashion.

Applicant is aware that commercially on the market there are magneto conversion kits. By these, a magneto is attached to the engine and the battery is eliminated. However, the kits commercially on the market are expensive and also require the use of a special distributor and special spark plugs.

SUMMARY OF THE INVENTION

1. New and Different Functions

I have solved the problems of the electrical system of the stationary internal combustion engine described above by the simple expedient of replacing the standard generator of the engine with a low power magnetic generator using a permanent disc magnet to produce the magnetic field and discarding the battery and voltage regulator. This also eliminates the problem caused by brushes.

As outlined above, the only need for electrical power on the stationary engine is to operate the spark ignition system. As stated above, many of the farmers today do not use the battery permanently upon the engine to start the engine but use it only to run the engine. Since there is no other electrical devices attached to the motor, there is no reason to have any more electrical power than is necessary to operate the engine.

I have found that if the field windings are replaced with a permanent disc or plate magnet, that the generator operates well. Then the voltage and the power produced by the generator is directly related to speed. However, if the speed is adjusted by the size of the pulley upon the generator so that the proper amount of electrical power is supplied at the normal operating speeds of 1,400 rpm. to 2,400 rpm. the equipment works well within these ranges. Normally, engines as used in this service have an idling speed of about 500 rpm., and perhaps the lowest possible idling speed of 350 rpm. to 400 rpm. By idling speed, it is meant the slowest speed at which the engine without load operates and runs smoothly. By lowest idle speed, it is meant the lowest speed that the engine will continue to operate without load regardless of the fact that it may be running irregularly.

Therefore, I have found that if the pulley size upon the generator of about 5" is used, that sufficient power will be produced to run the engine at the lower range of operating speeds, such as around 1,200 rpm. to 1,400 rpm. but still will not produce such excessive voltage as at 2,400 rpm. that is detrimental to the equipment.

I have found that plate or disc magnets normally used for loud speakers are suitable. These disc have a north pole along one radial face and a south pole along the other radial face. When used with clam shell type pole pieces, the pole pieces will produce the alternate north and south poles as commonly used in automobile electrical generators today. It will be noted that the normal generator today in comman usage is called an alternator since is produces an alternating current which must be rectified.

These disc magnets are made by powder metallurgy technology and are normally quite brittle. Furthermore, in making them, it is difficult to maintain precise controls on the exact diameter of the center hole. Therefore, on a commercial basis, it has been found difficult, if not impossible to mount them directly upon a metal shaft. Therefore, it has been found best to use a plastic bushing such as polyvinyl chloride (call PVC herein). Even so, it is found that it is best to use rubber "O" rings between the bushing and the disc itself.

It will be understood that for a ready supply of replacement parts, it is preferable that the engine be designed to use standard automotive replacement parts. i.e., the coils, condensers, and distributors that are normally adapted to be used on the normal low voltage 12 volt automotive system are preferable. Quality parts are readily available at moderate prices. Therefore, it is desirable to maintain the voltage so that these parts can be used, rather than having any requirements of more expensive parts.

2. Objects of the Invention

An object of the invention is to operate a spark ignition internal combustion engine continuously unattended for long periods of time.

Another object is to mount a magnetic disc on a rotor shaft.

Further objects are to achieve the above with devices that are sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is rapid, versatile, ecologically compatible, energy conserving, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENT

Figure 1:
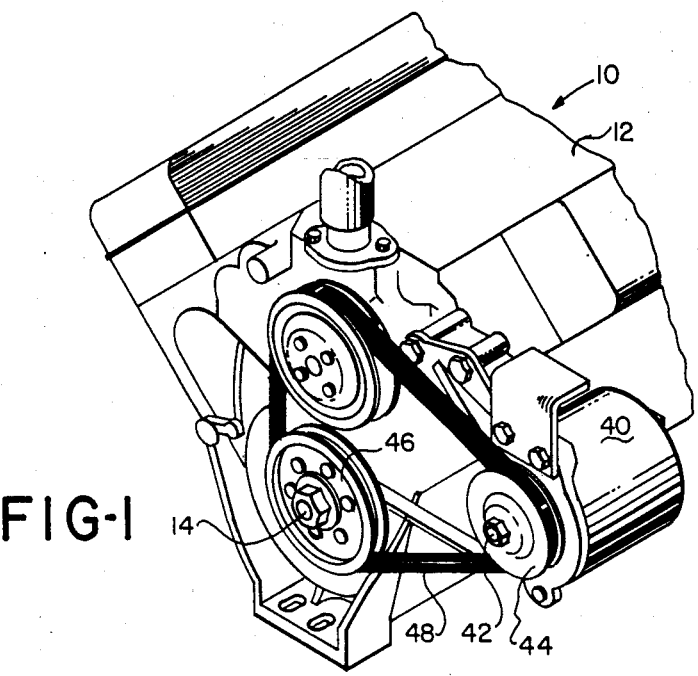
FIG. 1 is a partial perspective view of a stationary engine with a magnetic generator attached thereto.

Referring to the drawing, there may be seen in FIG. 1, stationary spark ignition internal combustion engine 10. It is well known that such engines will normally have engine block 12 wherein are found the pistons with connecting rods connecting to crank shaft 14.

Figure 2:
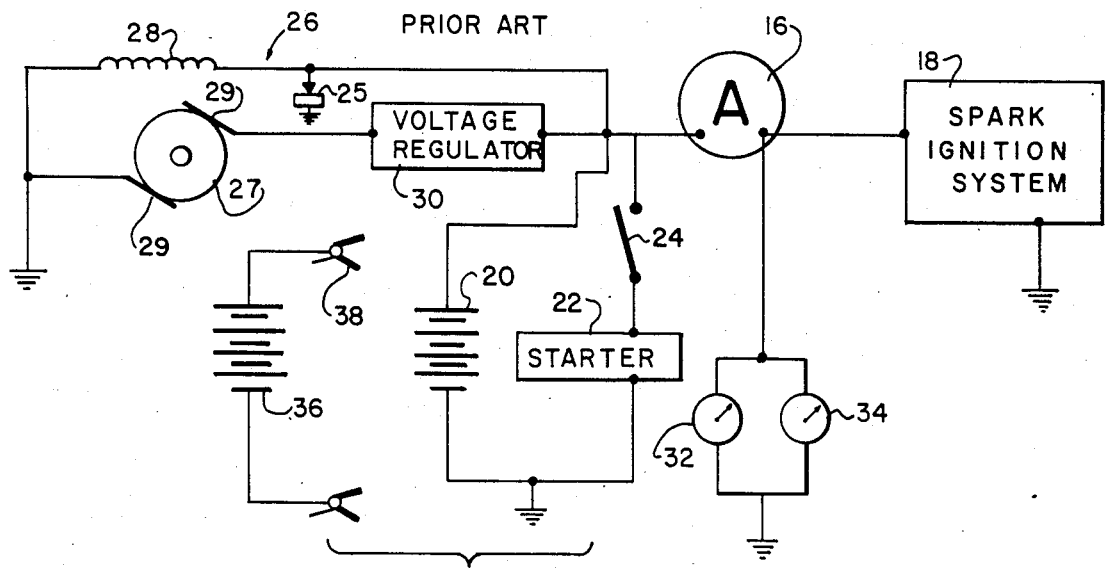
FIG. 2 is a schematic representaton of an electrical system of a stationary system as existing in the prior art before this invention.

The spark ignition system for the engine 10 is shown schematically in FIG. 2. Normally, a source of low D.C. voltage from battery 20 is connected to ammeter 16 to spark ignition system 18. By the spark ignition system, it is meant those necessary coils, breaker points, condensers, distributors, and spark plugs necessary to operate the engine 10.

As discussed above, high temperature switch means 32 is connected to the spark ignition system 18 to kill the engine 10 responsive to the coolant temperature exceeding the preset maximum. Low oil switch 34 is also connected to the spark ignition system to kill the engine responsive to the oil pressure of the engine dropping below a minimum preset value.

Electric starter 22 is connected by suitable switch (or relay) 24 to the battery 20. Also shown in FIG. 2 is the original electric generator 26 which includes the main stator winding 28 and the field winding 27 on the rotor with the associated brushes 29. The current through the field winding 27 on the rotor is controlled by voltage regulator 30 as well known in the prior art. The original electrical generator 26 also includes the diodes 25 by which the alternating current as otherwise produced is transformed into direct current so that the output of the stator winding 28 connected to the battery 20 charging the battery for use by the starter 22.

Also, the booster battery 36 with the booster clamps 38 have been shown as they would normally be used to supplement the normal battery 20 for starting.

Those with ordinary skill in the art will recognize that the starter operates on low D.C. voltage as does the spark ignition system operate on a low D.C. voltage. Also, those with ordinary skill in the art will recognize that what has been described to this point is old and well known to the art and commercially available on the market, as complete assemblage.

As those with ordinary skill in the art will recognize, FIG. 2 is a simplified schematic representation of what is well known and commercially available on the market. Since it is commonly used and commercially available, it has been greatly simplified, and the explanation has been abbreviated for conciseness.

Figure 3:
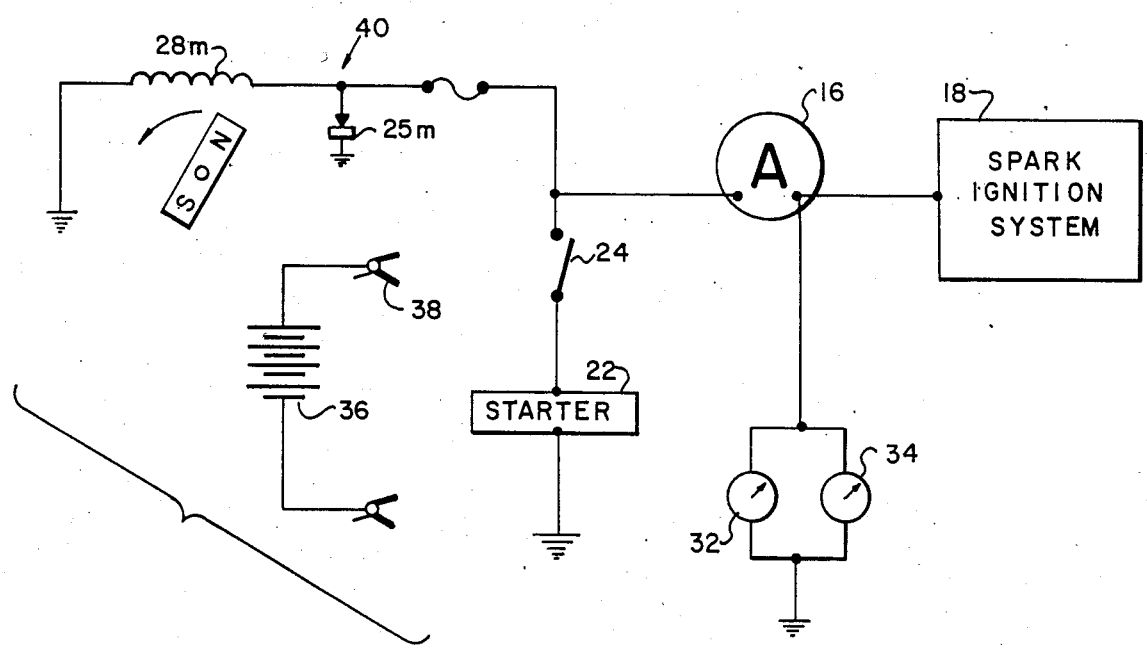
FIG. 3 is a schematic representation of the electrical system according to this invention.

This invention is schematically represented in FIG. 3. Thus it may be seen that the original electrical generator 26 has been eliminated along with the voltage regulator 30. In its place, a magnetic generator 40 has been substituted. The magnetic generator will have a permanent magnet rotor. Stator winding 28m in the magnetic generator 40 will be identical to the stator winding 28 in the original electrical generator 26. In fact, the entire housing, as well as the stator winding will be identical to that of the original electrical generator, thus simplifying procurement and replacement expenses. The housing will also contain the diodes 25m to rectify the current.

Figure 6:
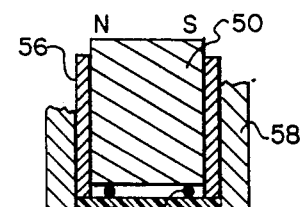
FIG. 6 is an axial sectional view taken substantially on line 6—6 of FIG. 5.
Figure 4:
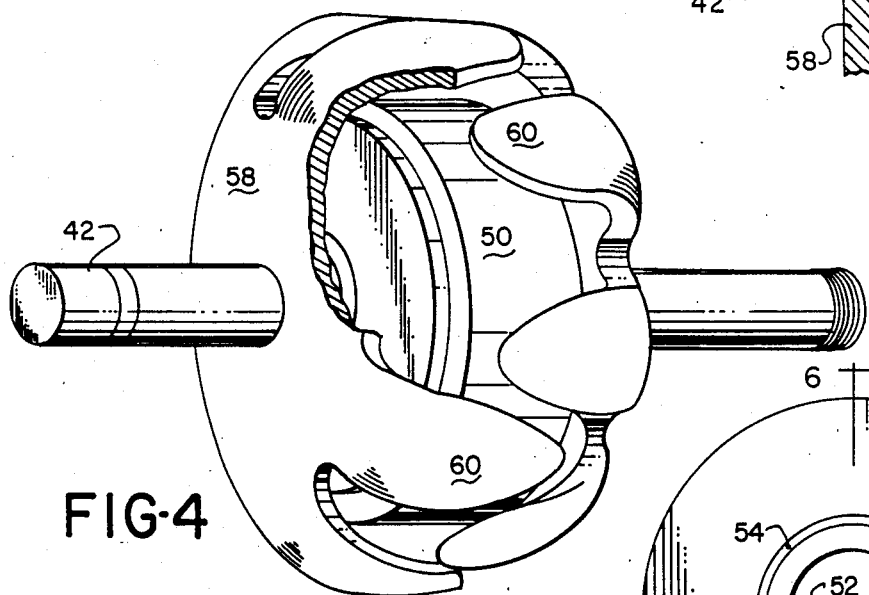
FIG. 4 is a perspective view of the generator rotor according to this invention, with parts broken away.
Figure 5:
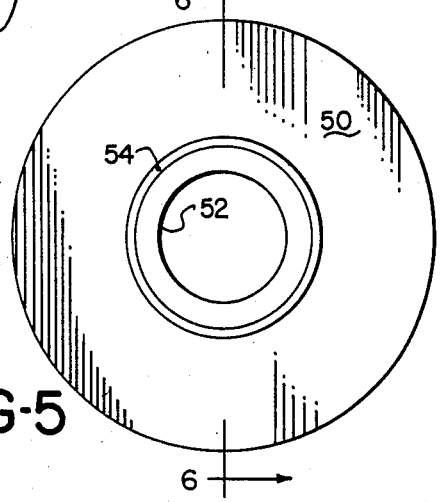
FIG. 5 is an end view of the magnetic disc, bushing, and "O" rings.

In the magnetic generator 40 the rotor will be permanent disc magnet 50 as illustrated in FIGS. 4, 5, and 6. The rotor of the magnetic generator will include shaft 42. Pulley 44 will be attached to the shaft 42 so that the magnetic generator 40 may be driven by crank shaft pulley 46 attached to the crank shaft 14 of the engine 10. Belt 48 connects the crank shaft pulley 46 to the generator pulley 44 (FIG. 1).

The shaft 42 will have the magnet disc 50 concentrically mounted thereon. The disc is mounted by PVC bushing 52 snugly attached to the shaft. "O" rings 54 fit over the bushing and within the bore within the magnetic disc 50. I have found that this connection securely and firmly attaches the magnetic disc 50 to the shaft 42. I have found that there are no balancing problems or slippage problems with this attachment.

As stated above, one radial face of the disc is a north pole and the other radial face, a south pole. Washer shaped pole pieces 56 are fitted over the bushing 52 and held firmly by magnetic attraction to the radial faces of the magnetic disc 50. The clam shell pole pieces 58 are attached over the shafts forming a press fit to the shaft 42. The clam pole pieces 58 and identical to the clam pole pieces which are found in the original electric generator 20. Therefore, the different individual poles 60 will be alternating north/south poles; and therefore, the operation of the magnetic generator 40 will be identical to the original electrical generator, except that there will be a constant magnetic field produced by the permanent disc magnet 50. It will be understood, of course, that the magnetic field as produced by the winding 27 varied as controlled by the voltage regulator 30.

As discussed above, since the magnetic field is constant, the voltage produced by the generator 40 will vary according to the speed. Therefore, it is necessary to control the speed so as not to produce to high a voltage for the spark ignition system. I have found that this is best done by changing the generator pulley 44. The size of the pulley should be increased so that the magnetic generator 40 runs slow enough so that at the lowest idling speed that there is insufficient power produced by the generator 40 to operate the engine. In normal practice, this has been found to be a 5" pulley; however, it varies with the individual engines and also, of course, with the strength of the disc magnet 40. It has been found that if the diameter of the pulley 44 is so selected that there will be adequate power to operate the engine at its normal operating speeds which, as stated before, vary between 1,400 rpm. and 2,400 rpm. Of course, at the upper operating speeds, additional stress is placed upon the parts of the spark ignition system 18 because of the higher voltage produced; however, experiences according to this invention, satisfactory service life is still obtained from these parts. Of course, when the engine is operated from the booster battery 36, as seen in FIG. 3, the spark ignition system is supplied by current from the booster battery at low speeds and idling speeds until the engine speed reaches normal operating speed.

i.e., the procedures for starting the engine is to connect the booster battery 36 to the starter 22, to start the engine 10, to increase the speed of the engine 10 to above idling speed, and then disconnect the booster battery 36.

The embodiment shown and described above is only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific examples above do not point out what an infringement of this patent would be, but are to enable on skilled in the art to make and use the invention.

As an aid to correlating the terms of the claims to the exemplary drawing, the following catalog of elements and steps is provided:

10: Engine
12: Block
14: Crank Shaft
16: Ammeter
18: Spark Ignition System
20: Battery
22: Starter
24: Start Switch
25: Rectifier
26: Original Electrical Generator
27: Field Winding
28: Stator Winding
29: Brushes
30: Voltage Regulator
32: High Temperature
34: Low Oil
36: Booster Battery
38: Booster Clamps
40: Magnetic Generator
42: Shaft
44: Pulley
46: Crank Shaft Pulley
48: Belt
50: Magnet Disc
52: Bushing
54: "O" Ring
56: Pole Pieces
58: Clam Pole Pieces
60: Poles.

I claim as my invention:

1. A magnetic rotor for an electrical generator including
   a. a stator with
   b. stator windings connected to
   c. diode rectifiers,
   d. said rotor including
   e. a shaft journaled to the stator, and
   f. two clam shell pole pieces on the shaft;
   g. wherein said improved structure comprises in combination with the above:
   h. a disc shaped magnet having two radial faces with a centrally located hole
   i. coaxial with the shaft
   j. between said clam shell pole pieces, with
   k. a washer pole piece between each radial face of the magnet and the clam pole piece,
   l. a synthetic plastic bushing snugly on the shaft,
   m. said disc magnet around the bushing, and
   n. two "O" rings between the bushing and disc magnet.

2. The process involving an internal combustion engine which in normal operation runs continuously unattended for periods in excess of 24 hours, said engine having
   a. an original electrical generator, battery, and voltage regulator,
   b. a high temperature switch means for killing the engine responsive to the coolant temperature exceeding a preset maximum,
   c. a low oil switch means for killing the engine responsive to the oil pressure falling below a preset minimum,
   d. an electric starter which operates on low D.C. voltage, and
   e. a spark ignition system which operates on low D.C. voltage;
   f. wherein the improved method comprises:
   g. removing the original electrical generator, battery, and voltage regulator from the engine, h. attaching structurally a permanent magnetic low voltage electrical generator having a permanent disc magnet rotor to the engine, i. connecting a booster battery to the engine for starting the engine, j. generating less low DC voltage electrical power by said permanent magnetic generator at lowest idle speeds of the engine with booster battery attached than the minimum power necessary to operate the spark ignition system at that lowest idle speeds, so that the engine must have the battery connected to run at that lowest idle speed, k. attaching electrically the low DC voltage output of said magnetic generator to said spark ignition system, and l. disconnecting the booster battery after the engine is started and running faster than idle speeds.

3. The invention as defined in claim 2 including all of the limitations a. through l. further comprising:

m. achieving the desired level of low voltage electrical power generation defined above by n. driving the rotor of the magnetic generator at a selected speed, o. driving the rotor of said magnetic generator by a belt and pulley from the engine, and p. selecting a diameter for said pulley to achieve the selected speed defined above.

* * * * *